United States Patent Office

3,374,284
Patented Mar. 19, 1968

3,374,284
PRODUCTION OF CONJUGATED DIOLEFINES
John Lynn Barclay, Tadsworth, and David James Hadley and James Robert Bethell, Epsom Downs, England, assignors to The Distillers Company Limited, Edinburgh, Scotland, a British company
No Drawing. Continuation-in-part of application Ser. No. 490,127, Sept. 24, 1965. This application Sept. 12, 1966, Ser. No. 578,498
Claims priority, application Great Britain, Oct. 12, 1960, 34,878/60; Jan. 25, 1961, 2,856/61; May 19, 1961, 18,256/61; Aug. 18, 1961, 29,802/61
11 Claims. (Cl. 260—680)

ABSTRACT OF THE DISCLOSURE

Process for the conversion of mono-olefines containing a chain of not less than four carbon atoms such as butenes or 2-alkyl butenes to the corresponding conjugated diolefine by forming a vapor mixture of the mono-olefine with oxygen and passing the mixture over a heated catalyst which is either a mixture of oxides of any of the elemental pairs, cobalt-tin, cobalt-titanium, tin-titanium, tin-tungsten, tin-molybdenum, titanium-tungsten, titanium-molybdenum, or a compound of oxygen with the metals of one of these pairs.

---

This application is a continuation-in-part of our co-pending application Ser. No. 490,127, filed Sept. 24, 1965, which is in turn a continuation-in-part of our application Ser. No. 142,531, filed Oct. 3, 1961, both now abandoned.

This invention relates to the production of conjugated diolefines from olefines.

According to the present invention the process for the production of a conjugated diolefine comprises reacting a mono-olefine whose formula contains a chain of not less than four carbons in the vapour phase with molecular oxygen over a unsupported catalyst consisting of (i) mixed oxides containing only one of the following elemental pairs: cobalt-tin, cobalt-titanium, tin-titanium, tin-tungsten, tin-molybdenum, titanium-tungsten and titanium-molybdenum, and (ii) a compound of oxygen with one of the aforesaid elemental pairs.

The catalysts used in the process of the present invention include one of the elemental pairs: cobalt-tin, cobalt-titanium, tin-titanium, tin-tungsten, tin-molybdenum, titanium-tungsten, and titanium molybdenum combined with oxygen, and may be regarded either as mixtures of the oxides or as oxygen-containing compounds of the elements, such as tin-tungstate, and tin molybdate. Under the reaction conditions the catalyst may be present in both forms. The preferred catalysts are molybdates of tin and tungstates of titanium because of the unusually high yields which can be obtained by their use.

The catalysts may be prepared in any suitable manner, for example, by intimately mixing together the oxides of at least two of the elements. Alternatively compounds of the elements which on heating are partially or completely converted to the oxides may be used together, or such a compound of one of the elements may be used with an oxide of the other. Alternatively, mixed compounds of two elements may be co-precipitated from solution. Although the catalytic compositions prepared as described above can be used as such, it is sometimes advantageous to subject them to a prior heat-treatment in the presence of an oxygen-containing gas such as air, for instance at a temperature in the range 550°–1100° C.

In the process of this invention a mono-olefine, whose formula contains a chain of not less than four carbon atoms, in admixture with free oxygen-containing gas, is brought into contact with the unsupported catalyst in any suitable manner, for example in a fixed bed reactor or in a fluidised bed reactor. The proportion of mono-olefine in the feed may vary within fairly wide limits, for example within the range 1% to 20% by volume. It is preferred to use butene-1, butene-2, 2-methylbutene-1 or 2-methylbutene-2 as olefine starting materials in the process. The straight chain butenes are converted to butadiene. The 2-methylbutenes are converted to isoprene.

The concentration of oxygen in the reaction mixture may vary within fairly wide limits, but it is preferred to operate with an oxygen concentration between 1% and 21% of the reaction mixture. The feed preferably also contains an inert diluent, for example, nitrogen or steam. It is preferred to use a mixture of nitrogen and steam as diluent and the oxygen may thus conveniently be supplied in the form of air.

The reaction is preferably carried out at a temperature below 550° C., and particularly in the range 200–500° C. The most preferred temperature range is 300–450° C. The contact time may be, for example, within the range 1–30 seconds.

The reaction may be carried out at atmospheric, sub-atmospheric or superatmospheric pressure.

The conjugated diolefines formed in the process of this invention may be recovered by any suitable means, for example, by extraction into an organic solvent, or by condensation, if necessary with freezing, and fractionation of the product.

EXAMPLE 1

Tin powder (63.0 parts) was added slowly, with good stirring to a solution of nitric acid (376 parts of nitric acid S.G. 1.42 and 1060 parts of water) maintained at 100° C. The resultant precipitate was collected, washed with water and made into a creamy paste. To this paste molybdic oxide (3.8 parts) was added and intimately mixed. The slurry was dried at 100° C. and the product broken down to less than 25 mesh B.S.S. and pelleted using 2% graphite. The pellets were then heated first at 750° C. for 16 hours and then at 1000° C. for 16 hours.

The molar ratio of tin to molybdenum in the catalyst was 20:1.

A gaseous mixture of 9.3% by volume of 2-methylbutene-2, 4.8% by volume of oxygen and 85.9% by volume of nitrogen, was passed over the catalyst maintained in a reactor at 510° C. the contact time being 3.9 seconds.

Of the 2-methylbutene-2 fed to the reactor 21.8% was converted to isoprene. The yield of isoprene based on 2-methylbutene-2 consumed was 68.2%.

EXAMPLE 2

A gaseous mixture of 10.1% by volume of butene-2, 50.1% by volume of air, and 39.8% by volume of steam was passed over the catalyst described in Example 2 maintained in a reactor at 440° C., the contact time being 3.3 seconds.

Of the butene-2 fed to the reactor 32.0% was converted to butadiene. The yield of butadiene based on butene-2 consumed was 53.3%.

EXAMPLE 3

Titanium dioxide (40.0 parts) and tungstic acid (134.0 parts) were mixed to form a slurry with a little water. This was dried at 100° C., the resulting granules were ground to less than 25 mesh B.S.S. and pelleted with 2% graphite. The pellets were heat-treated at 600° C. for 16 hours.

A gaseous mixture of 5.1% by volume of 2-methylbutene-2, 10.7% by volume of oxygen, 44.8% by volume of nitrogen, and 39.5% by volume of steam was passed over the catalyst maintained in a reactor at 376° C., the contact time being 4.0 seconds.

Of the 2-methylbutene-2 fed to the reactor 16.8% was converted to isoprene. The yield of isoprene based on 2-methylbutene-2 consumed was 55.2%.

EXAMPLE 4

A gaseous mixture of 10.3% by volume of butene-2, 50.1% by volume of air and 39.6% by volume of steam was passed over the catalyst described in Example 3 maintained in a reactor at 425° C., the contact time being 4.0 seconds.

Of the butene-2 fed to the reactor 13.0% was converted to butadiene. The yield of butadiene based on butene-2 consumed was 42.3%.

EXAMPLE 5

Molybdic oxide (144 parts) and titanium dioxide (79.9 parts) were mixed to form a slurry with water, dried at 100° C. and the product broken down to less than 25 mesh B.S.S. The powder was pelleted, using 2% graphite and the pellets heat-treated at 600° C. and then at 650° C., both for 16 hours.

A gaseous mixture of 4.8% by volume of 2-methylbutene-2, 12.6% by volume of oxygen, 40.5% by volume of nitrogen, and 42.0% by volume of steam was passed over the catalyst maintained in a reactor at 400° C., the contact time being 4.3 seconds.

Of the 2-methylbutene-2 fed to the reactor 17.1% was converted to isoprene. The yield of isoprene based on 2-methylbutene-2 consumed was 32.2%.

EXAMPLE 6

A gaseous mixture of 10.1% by volume of butene-2, 50.0% by volume of air and 39.9% by volume of steam was passed over the catalyst of Example 5 maintained in a reactor at 490° C., the contact time being 4.0 seconds.

Of the butene-2 fed to the reactor 19.6% was converted to butadiene. The yield of butadiene based on butene-2 consumed was 38.8%.

EXAMPLE 7

Stannic oxide (56.2 parts) and tungstic acid (100.0 parts) were mixed to form a slurry with water, dried at 100° C. and the product broken down to less than 25 mesh B.S.S. and pelleted using 2% graphite. The pellets were then heated at 600° C. for 16 hours.

A gaseous mixture of 10.0% by volume of butene-2, 50.7% by volume of air and 39.3% by volume of steam was passed over the catalyst maintained in a reactor at 440° C. the contact time being 3.9 seconds.

Of the butene-2 fed to the reactor 12.3% was converted to butadiene. The yield of butadiene based on butene-2 consumed was 30.6%.

We claim:

1. A process for the production of a conjugated diolefine which comprises reacting a mono-olefine whose formula contains a chain of at least four carbon atoms in the vapour phase in the sustantial absence of halogen with molecular oxygen over an unsupported catalyst consisting essentially of (i) mixed oxides containing only one of the following elemental pairs: tin-titanium, tin-tungsten, tin-molybdenum, titanium-tungsten and titanium molybdenum, or (ii) a compound of oxygen with one of the aforesaid elemental pairs.

2. The process as claimed in claim 1 wherein the catalyst is a titanium tungstate.

3. The process as claimed in claim 1 wherein the catalyst is a tin molybdate.

4. The process according to claim 1 wherein the catalyst is subjected to a preheat treatment at between 500° and 1100° C.

5. The process according to claim 1 wherein the proportion of mono-olefine in the feed is within the range 1% to 25% by volume.

6. The process according to claim 1 wherein the concentration of oxygen in the reaction mixture is between 1 and 21% by volume.

7. The process according to claim 1 carried out in the presence of an inert diluent.

8. The process as claimed in claim 7 wherein the inert diluent is selected from the group consisting of nitrogen, steam and mixtures thereof.

9. The process as claimed in claim 1 carried out at a temperature in the range 200°–500° C.

10. The process according to claim 1 wherein the contact time is within the range 1 to 30 seconds.

11. The process according to claim 1 wherein the mono-olefine is selected from the group consisting of butene-1, butene-2, 2-methylbutene-1 and 2-methylbutene-2.

References Cited

UNITED STATES PATENTS

| | | | |
|---|---|---|---|
| 2,326,258 | 8/1943 | Schmidt et al. | 260—680 |
| 3,159,688 | 12/1964 | Jennings et al. | 260—680 |
| 3,161,670 | 12/1964 | Adams et al. | 260—683.3 X |
| 3,205,280 | 9/1965 | Wattimena et al. | 260—680 |
| 3,207,805 | 9/1965 | Gay | 260—680 |

PAUL M. COUGHLAN, Jr., *Primary Examiner.*